United States Patent
Suzuki et al.

(10) Patent No.: US 9,772,234 B2
(45) Date of Patent: Sep. 26, 2017

(54) THERMISTOR MODULE

(71) Applicants: Toyota Jidosha Kabushiki Kaisha, Toyota-shi, Aichi-ken (JP); Aisin AW Co., Ltd., Anjo-shi, Aichi-ken (JP)

(72) Inventors: Shinjiro Suzuki, Kariya (JP); Taketo Takeuchi, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 329 days.

(21) Appl. No.: 14/483,628

(22) Filed: Sep. 11, 2014

(65) Prior Publication Data

US 2015/0078418 A1    Mar. 19, 2015

(30) Foreign Application Priority Data

Sep. 13, 2013  (JP) .................................. 2013-190348

(51) Int. Cl.
  *G01K 1/08* (2006.01)
  *G01K 7/22* (2006.01)
  *G01K 13/00* (2006.01)
  *G01K 1/16* (2006.01)

(52) U.S. Cl.
  CPC .................. *G01K 7/22* (2013.01); *G01K 1/16* (2013.01); *G01K 13/00* (2013.01)

(58) Field of Classification Search
  None
  See application file for complete search history.

(56) References Cited

U.S. PATENT DOCUMENTS

| | | | | |
|---|---|---|---|---|
| 3,606,792 | A | * | 9/1971 | Yoshimoto ............... G01K 1/08 374/155 |
| 5,367,282 | A | * | 11/1994 | Clem ....................... G01K 1/08 338/22 R |
| 2006/0239332 | A1 | * | 10/2006 | Harr ......................... G01J 5/02 374/208 |
| 2012/0112580 | A1 | * | 5/2012 | Sato ....................... H02K 3/522 310/71 |

FOREIGN PATENT DOCUMENTS

| | | |
|---|---|---|
| CL | 101103907 A | 1/2008 |
| JP | 06-058334 U | 8/1994 |
| JP | 2004-297958 A | 10/2004 |
| JP | 2006-064497 A | 3/2006 |
| JP | 2008022679 A | 1/2008 |
| JP | 2009-100538 A | 5/2009 |

* cited by examiner

*Primary Examiner* — Erica Lin
(74) *Attorney, Agent, or Firm* — Dinsmore & Shohl LLP

(57) ABSTRACT

A thermistor module disposed in an insertion hole formed in a mold material that covers a stator coil of a rotary electric machine, and configured to measure a temperature of the stator coil includes: a heat collection member that faces an inner peripheral surface of the insertion hole in a state where the thermistor module is disposed in the insertion hole.

4 Claims, 2 Drawing Sheets

THERMISTOR MODULE

BACKGROUND OF THE INVENTION

1. Field of the Invention

The present invention relates to a thermistor module configured to measure a temperature, more particularly, to a thermistor module configured to measure a temperature of a stator coil covered with a mold material.

2. Description of Related Art

In Japanese Patent Application Publication No. 2009-100538 (JP 2009-100538 A), in order to measure a temperature of a stator coil covered with a molding resin, a thermistor module is inserted into an insertion hole formed in the molding resin.

In a structure in which a stator coil is covered with a mold material, it is difficult to measure its temperature by directly putting, on the stator coil, a temperature measuring portion of a thermistor module. In JP 2009-100538 A, the temperature of the stator coil is measured by inserting the thermistor module into the insertion hole formed in the molding resin (a mold material). However, the molding resin is provided between the stator coil and a temperature measuring portion of the thermistor module, so that heat of the stator coil is transmitted to the temperature measuring portion of the thermistor module via the molding resin. As a result, in comparison with a case where the temperature measuring portion of the thermistor module is directly put on the stator coil to measure the temperature, measurement accuracy of the temperature of the stator coil is decreased.

Further, Japanese Patent Application Publication No. 2006-64497 (JP 2006-64497 A) and Japanese Utility Model Application Publication No. 6-58334 (JP 6-58334 U) describe thermistors each provided with a heat collection pattern or a heat collection body in order to improve thermal responsiveness of the thermistors. However, it is difficult to directly apply the thermistors to that thermistor module configured to measure a temperature of a stator coil which the present invention targets.

SUMMARY OF THE INVENTION

An object of the present invention is to improve measurement accuracy of a temperature of a stator coil covered with a mold material.

In order to achieve the object, a thermistor module according to one aspect of the present invention adopts the following approach.

The thermistor module according to one aspect of the present invention is a thermistor module disposed in an insertion hole formed in a mold material that covers a stator coil of a rotary electric machine, and the thermistor module configured to measure a temperature of the stator coil, and the thermistor module includes a heat collection member that faces an inner peripheral surface of the insertion hole in a state where the thermistor module is disposed in the insertion hole.

According to the present invention, due to the heat collection member that faces the inner peripheral surface of the insertion hole formed in the mold material, it is possible to improve a heat collection effect from the mold material, thereby making it possible to improve measurement accuracy of the temperature of the stator coil covered with the mold material.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes a mode for carrying out the present invention (hereinafter referred to as "embodiment") with reference to the drawings.

Figure 1:
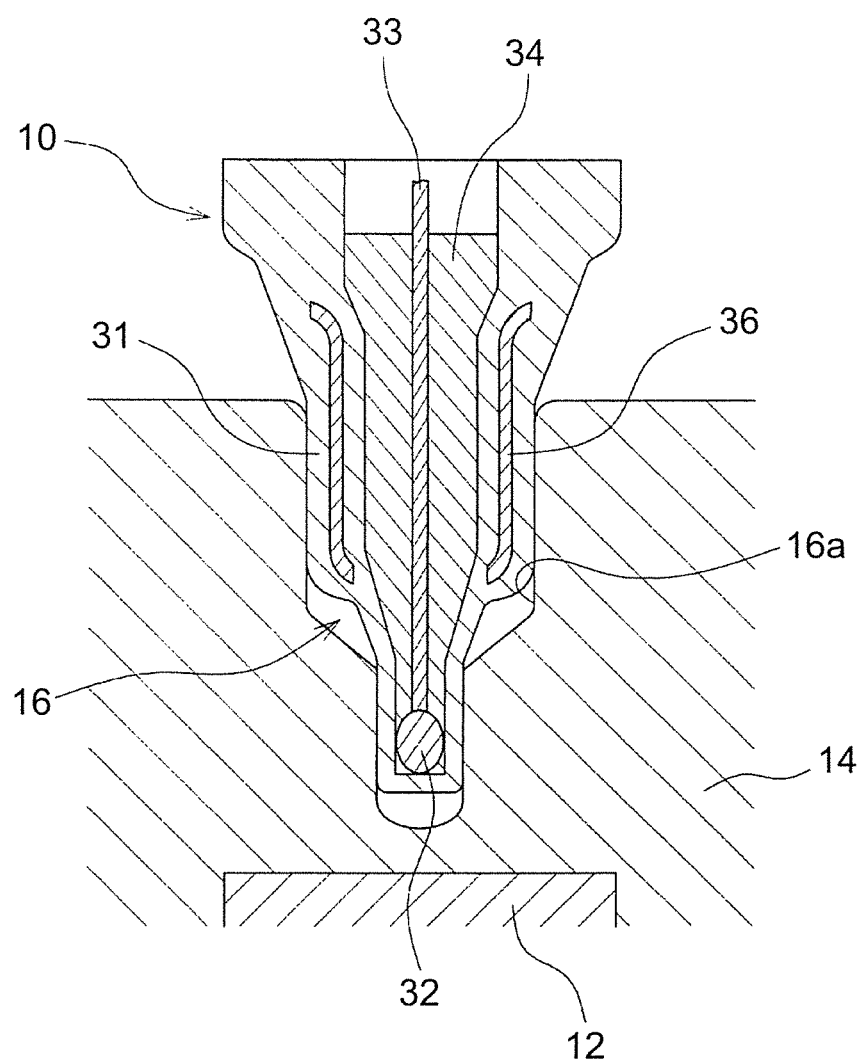
FIG. 1 is a sectional view illustrating an internal configuration of a thermistor module according to an embodiment of the present invention.

FIG. 1 is a sectional view illustrating an internal configuration of a thermistor module 10 according to the embodiment of the present invention. In order to measure a temperature of a stator coil 12 of a rotary electric machine, FIG. 1 illustrates a state where the thermistor module 10 is mounted in a molding resin 14 of a stator. The stator coil 12 is covered with the molding resin (a mold material) 14. In the stator of the rotary electric machine, a configuration in which the stator coil 12 is wound around a stator core, and a configuration in which the stator coil 12 is molded (sealed) by the molding resin 14 can be realized by well-known configurations (see, for example, JP 2009-100538 A). Accordingly, descriptions thereof are omitted.

In order to measure the temperature of the stator coil 12 covered with the molding resin 14, an insertion hole 16 is formed in the molding resin 14, and the thermistor module 10 is disposed in the insertion hole 16. In the thermistor module 10, an accommodation portion (a hollow portion) is formed in a thermistor case 31 made from resin, and a thermistor element 32 serving as a temperature measuring portion is accommodated in a tip end of the accommodation portion. The thermistor element 32 is connected to a temperature measuring circuit (not shown) via an electric wiring 33 that passes through the accommodation portion of the thermistor case 31. Further, the accommodation portion of the thermistor case 31 is filled with a filling resin (a filler) 34. The insertion hole 16 of the molding resin 14 is formed so as to extend to a position close to the stator coil 12, and in a state where the thermistor module 10 is disposed in the insertion hole 16, the thermistor element 32 is placed close to the stator coil 12.

In the present embodiment, a heat collection plate (a heat collection member) 36 is formed in the thermistor case 31 by insert molding. The heat collection plate 36 is buried in the thermistor case 31 around a whole circumference (or generally the whole circumference) thereof. In a state where the thermistor module 10 is disposed in the insertion hole 16, the thermistor case 31 makes contact with an inner peripheral surface 16a of the insertion hole 16, so that the heat collection plate 36 is placed close to the inner peripheral surface 16a of the insertion hole 16 so as to face, via the thermistor case 31, a whole circumference (or generally the whole circumference) of the inner peripheral surface 16a of the insertion hole 16. It is also possible to configure the heat collection plate 36 to extend toward a tip end of the thermistor case 31 so that the heat collection plate 36 is connected to the thermistor element 32. The heat collection plate 36 is made from a material having a heat conductivity higher than that of the molding resin 14 and the thermistor case 31 (resin). For example, the heat collection plate 36 can be made from a metal plate such as a steel plate, an aluminum plate, or a copper plate. Further, the heat collection plate 36 has a rigidity higher than that of the thermistor case 31 (resin), and functions as a reinforcement that reinforces the thermistor case 31.

When a current flows to the stator coil 12 and the stator coil 12 generates heat, the heat of the stator coil 12 is transmitted to the molding resin 14. As illustrated by arrows A in FIG. 2, the heat thus transmitted to the molding resin 14 is transmitted to the thermistor element 32 via a path passing through a slight air space between the molding resin 14 and the tip end of the thermistor case 31, and the tip end of the thermistor case 31. When a temperature of the thermistor element 32 changes, a resistance value thereof changes. In view of this, by measuring the resistance value of the thermistor element 32, it is possible to measure the temperature of the stator coil 12.

Note that the heat transmitted to the molding resin 14 from the stator coil 12 is going to spread to the whole molding resin 14. At this time, when a ratio of an amount of the heat to be transmitted to the thermistor element 32 with respect to an amount of the heat transmitted to the molding resin 14 is decreased, followability of a change in the temperature of the thermistor element 32 with respect to a change in the temperature of the stator coil 12 is decreased, thereby resulting in that measurement accuracy of the temperature of the stator coil 12 is decreased.

Figure 2:
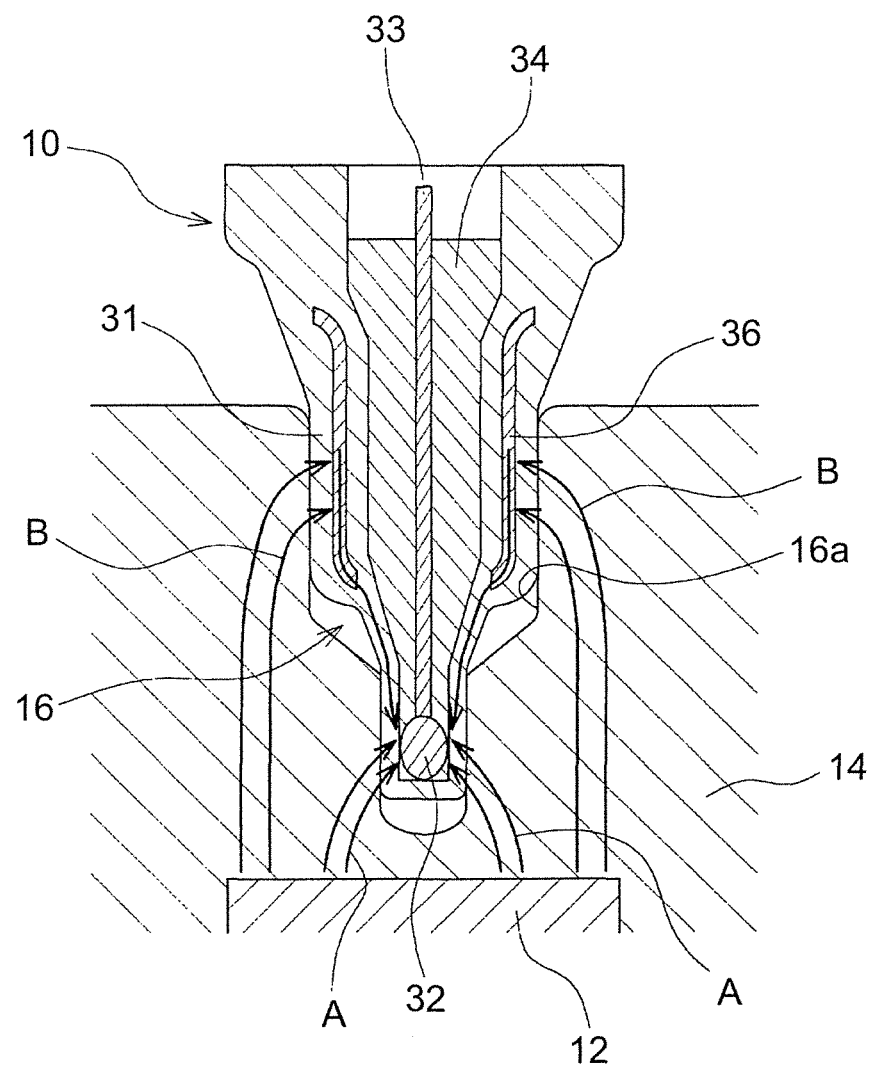
FIG. 2 is a view to describe how heat is transmitted from a stator coil to the thermistor module.

On the other hand, in the present embodiment, the heat transmitted to the molding resin 14 is transmitted to the thermistor element 32 not only via the path illustrated by the arrows A in FIG. 2, but also transmitted to the thermistor element 32 via a path passing through a slight air space between the molding resin 14 and a bottom side of the thermistor case 31, the thermistor case 31 (the bottom side), and the heat collection plate 36, as illustrated by arrows B in FIG. 2. Due to the heat collection plate 36 closely placed so as to face the inner peripheral surface 16a of the insertion hole 16, it is possible to increase a heat collection effect from the molding resin 14. This makes it possible to efficiently transmit the heat to the thermistor element 32 via the heat collection plate 36, and to increase the ratio of the amount of the heat to be transmitted to the thermistor element 32 with respect to the amount of the heat transmitted to the molding resin 14 from the stator coil 12. Accordingly, even in the structure in which the stator coil 12 is covered with the molding resin 14 and it is difficult to measure a temperature thereof by directly putting the thermistor module 10 on the stator coil 12, it is possible to improve the followability of the change in the temperature of the thermistor element 32 with respect to the change in the temperature of the stator coil 12, thereby making it possible to improve the measurement accuracy of the temperature of the stator coil 12.

Further, in the present embodiment, it is also possible to reinforce the thermistor case 31 by the heat collection plate 36, and thus, it is possible to improve rigidity/strength of the thermistor module 10.

The embodiment of the present invention has been explained as above, but it is needless to say that the present invention is not limited to the above embodiment at all and may be performable in various embodiments as long as the various embodiments are not beyond the gist thereof.

What is claimed is:

1. A thermistor module disposed in an insertion hole formed in a mold material that covers a stator coil of a rotary electric machine, and the thermistor module configured to measure a temperature of the stator coil, the thermistor module comprising:
    a thermistor element having a resistance value, the resistance value changes with respect to changes in temperature of the thermistor element;
    a thermistor case formed of a resin material;
    an accommodation portion formed in the thermistor case, the thermistor element accommodated in the accommodation portion; and
    a heat collection member encased within the thermistor case at position farther from the stator coil of the rotary electric machine than the thermistor element, the heat collection member faces an inner peripheral surface of the insertion hole in a state where the thermistor module is disposed in the insertion hole, the heat collection member is formed of a metal material.

2. The thermistor module of claim 1, wherein the heat collection member has a higher rigidity than a rigidity of the thermistor case such that the heat collection member reinforces the thermistor case.

3. The thermistor module of claim 1 further comprising:
    the thermistor element disposed at a tip end of the thermistor case.

4. The thermistor module of claim 1, wherein the accommodation portion is filled with a resin.

* * * * *